(12) United States Patent
Viselli et al.

(10) Patent No.: US 12,384,500 B2
(45) Date of Patent: Aug. 12, 2025

(54) METHOD OF ASSEMBLING AND DEPLOYING A FLOATING OFFSHORE WIND TURBINE PLATFORM

(71) Applicant: University of Maine System Board of Trustees, Orono, ME (US)

(72) Inventors: Anthony M. Viselli, Orono, ME (US);
Habib J. Dagher, Orono, ME (US);
Jacob C. Ward, Orono, ME (US);
Andrew J. Goupee, Orono, ME (US);
Christopher K. Allen, Orono, ME (US)

(73) Assignee: University of Maine System Board of Trustees, Orono, ME (US)

( * ) Notice: Subject to any disclaimer, the term of this patent is extended or adjusted under 35 U.S.C. 154(b) by 501 days.

(21) Appl. No.: 17/919,363

(22) PCT Filed: Apr. 16, 2020

(86) PCT No.: PCT/US2020/028432
§ 371 (c)(1),
(2) Date: Oct. 17, 2022

(87) PCT Pub. No.: WO2021/211121
PCT Pub. Date: Oct. 21, 2021

(65) Prior Publication Data
US 2023/0159141 A1 May 25, 2023

(51) Int. Cl.
*B63B 77/10* (2020.01)
*B63B 1/04* (2006.01)
(Continued)

(52) U.S. Cl.
CPC ............. *B63B 77/10* (2020.01); *B63B 1/107* (2013.01); *B63B 21/50* (2013.01); *F03D 13/25* (2016.05);
(Continued)

(58) Field of Classification Search
CPC ......... B63B 77/10; B63B 1/107; B63B 21/50; B63B 2001/044; B63B 2035/446;
(Continued)

(56) References Cited

U.S. PATENT DOCUMENTS 10,716,296 B2 * 7/2020 Zheng ................... A01K 61/10
10,774,813 B2 9/2020 Fernandez Gomez et al.
(Continued)

FOREIGN PATENT DOCUMENTS

CN 104619984 5/2015
CN 106573665 4/2017
(Continued)

OTHER PUBLICATIONS

Japanese Office Action, Application No. 2022-56290, dated Feb. 19, 2024.
(Continued)

*Primary Examiner* — Daniel V Venne
(74) *Attorney, Agent, or Firm* — MacMillan, Sobanski & Todd, LLC

(57) ABSTRACT

A method of assembling and deploying a floating offshore wind turbine (FOWT) platform includes floating a buoyant floater and a hollow outer tank in a floating assembly, placing permanent ballast material in the hollow outer tank to define a mass, and sinking the mass to a seabed. The buoyant floater is moved to a position over the mass. Transit lines are attached between a lifting device in the buoyant floater and the mass to define a FOWT platform. The mass is lifted to a point directly under the buoyant floater and the FOWT platform is towed to an installation site. Mooring lines are attached between anchors in the seabed and the buoyant floater, and the mass is lowered to a depth wherein suspension lines attached thereto are taught, the mass with
(Continued)

the suspension lines defining a suspended mass. The transit lines are then stored or removed from the mass.

22 Claims, 6 Drawing Sheets

(51) Int. Cl.
  *B63B 1/10* (2006.01)
  *B63B 21/50* (2006.01)
  *B63B 35/44* (2006.01)
  *F03D 13/25* (2016.01)
(52) U.S. Cl.
  CPC ... *B63B 2001/044* (2013.01); *B63B 2035/446* (2013.01)
(58) Field of Classification Search
  CPC ......... B63B 22/20; B63B 35/44; F03D 13/10; F03D 13/25; F03D 13/40; F03D 80/00; F05B 2240/932; F05B 2240/95; Y02E 10/72; Y02E 10/727
  USPC ................. 114/121, 122, 144, 123, 124, 125
  See application file for complete search history.

(56) References Cited

U.S. PATENT DOCUMENTS

| 11,208,987 | B2 | 12/2021 | Stiesdal |
| 11,383,799 | B2 | 7/2022 | Colmard et al. |
| 11,448,193 | B2 | 9/2022 | Wong |
| 2008/0240864 | A1 | 10/2008 | Belinsky |
| 2012/0121340 | A1 | 5/2012 | Pao |
| 2017/0197690 | A1 | 7/2017 | Nakamura |
| 2017/0204768 | A1 | 7/2017 | Doring et al. |
| 2019/0263477 | A1 | 8/2019 | Dagher et al. |
| 2021/0276673 | A1* | 9/2021 | Boo ........................ B63B 35/44 |

FOREIGN PATENT DOCUMENTS

| CN | 109154280 | | 1/2019 |
| CN | 109838351 | | 6/2019 |
| JP | 55001262 | A | 1/1980 |
| JP | 2015513046 | A | 4/2015 |
| JP | 2016022783 | A | 2/2016 |
| JP | 2017505262 | A | 2/2017 |
| JP | 2017521596 | A | 8/2017 |
| WO | 2013155521 | | 10/2013 |
| WO | 2013155521 | A1 | 10/2013 |
| WO | 2018018103 | A1 | 2/2018 |
| WO | 2019106283 | A1 | 6/2019 |

OTHER PUBLICATIONS

The Extended European Search Report, Application No. 20930777.6, dated Feb. 23, 2024.
China National Intellectual Property Administration Notification of the First Office Action, Application No. 202080101271.X, dated Feb. 27, 2025.
Brazilian Preliminary Office Action, Application No. BR112022020947-9, dated May 7, 2024.

* cited by examiner

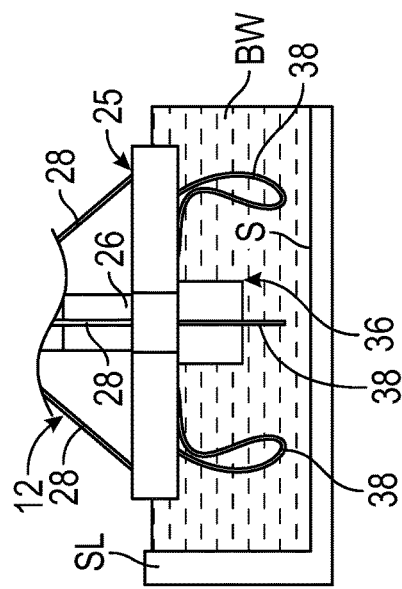
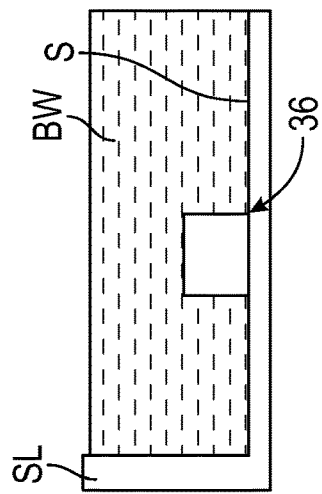
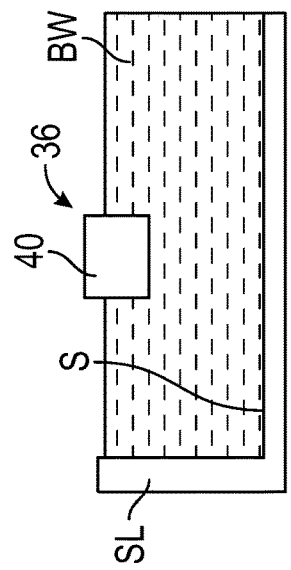
FIG. 4C
FIG. 4B
FIG. 4A

METHOD OF ASSEMBLING AND DEPLOYING A FLOATING OFFSHORE WIND TURBINE PLATFORM

BACKGROUND OF THE INVENTION

This invention relates in general to wind turbine platforms. In particular, this invention relates to an improved method of assembling and deploying a floating offshore wind turbine (FOWT) platform into a body of water.

Wind turbines for converting wind energy to electrical power are known and provide an alternative energy source for power companies. On land, large groups of wind turbines, often numbering in the hundreds of wind turbines, may be placed together in one geographic area. These large groups of wind turbines can generate undesirably high levels of noise and may be viewed as aesthetically unpleasing. An optimum flow of air may not be available to these land-base wind turbines due to obstacles such as hills, woods, and buildings.

Groups of wind turbines may also be located offshore, but near the coast at locations where water depths allow the wind turbines to be fixedly attached to a foundation on the seabed. Over the ocean, the flow of air to the wind turbines is not likely to be disturbed by the presence of various obstacles (i.e., as hills, woods, and buildings) resulting in higher mean wind speeds and more power. The foundations required to attach wind turbines to the seabed at these near-coast locations are relatively expensive, and can only be accomplished at relatively shallow depths, such as a depth of up to about 45 meters.

The U.S. National Renewable Energy Laboratory has determined that winds off the U.S. Coastline over water having depths of 30 meters or greater have an energy capacity of about 3,200 TWh/yr. This is equivalent to about 90 percent of the total U.S. energy use of about 3,500 TWh/yr. The majority of the offshore wind resource resides between 37 and 93 kilometers offshore where the water is over 60 meters deep. Fixed foundations for wind turbines in such deep water are likely not economically feasible. This limitation has led to the development of floating platforms for wind turbines. Known floating wind turbine platforms are formed steel and are based on technology developed by the offshore oil and gas industry. There remains a need in the art however, for improved methods of assembling and deploying a FOWT platform.

SUMMARY OF THE INVENTION

This invention relates in general to methods of assembling and deploying a floating offshore wind turbine (FOWT) platforms and the wind turbines mounted thereon. The FOWT platforms described herein are characterized by a negatively buoyant mass suspended from a positively buoyant floater by a plurality of suspension lines. In particular, this invention relates to an improved method of assembling and deploying a floating offshore wind turbine (FOWT) platform including floating a hollow outer tank in a floating assembly area of a body of water, the hollow outer tank having transit lines and suspension lines attached thereto, floating a buoyant floater in the floating assembly area of the body of water, and placing permanent ballast material in the outer tank to define a mass, and sinking the mass to a seabed of the body of water. Free ends of the transit lines and the suspension lines are raised to a surface of the body of water with buoys, and the buoyant floater is moved to a position over the mass. The transit lines are attached to a lifting device in the buoyant floater and the suspension lines are attached to a portion of the buoyant floater, the combined buoyant floater and the mass defining a FOWT platform. The mass is lifted with the lifting device to a point directly under the buoyant floater, and the FOWT platform is towed to an installation site in the body of water. Mooring lines are attached to anchors in the seabed and to the buoyant floater. The mass is lowered with the transit lines and the lifting device to a depth wherein the suspension lines are taught, thus suspending the mass with the suspension lines to define a suspended mass. The transit lines are then stored or removed from the mass.

Various aspects of this invention will become apparent to those skilled in the art from the following detailed description of the preferred embodiment, when read in light of the accompanying drawings.

BRIEF DESCRIPTION OF THE DRAWINGS

FIG. 4A is a schematic illustration of a first step of a first embodiment of the improved method of this invention.

FIG. 4B is a schematic illustration of a second step of the first embodiment of the improved method of this invention.

FIG. 4C is a schematic illustration of a third step of the first embodiment of the improved method of this invention.

DETAILED DESCRIPTION OF THE PREFERRED EMBODIMENT

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
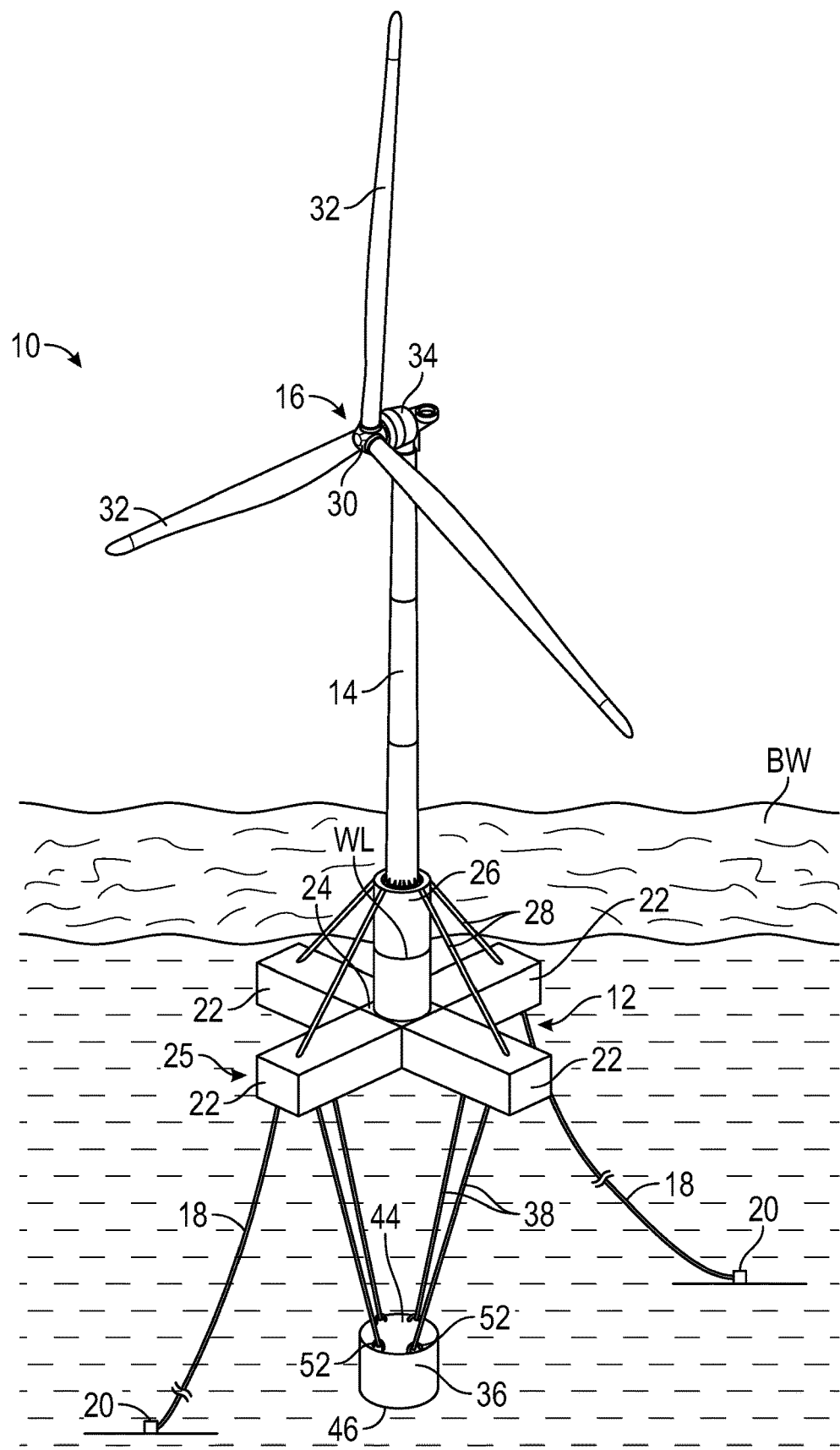
FIG. 1 is a perspective view of a floating offshore wind turbine platform assembled and deployed according to the improved method of this invention.
Figure 2:
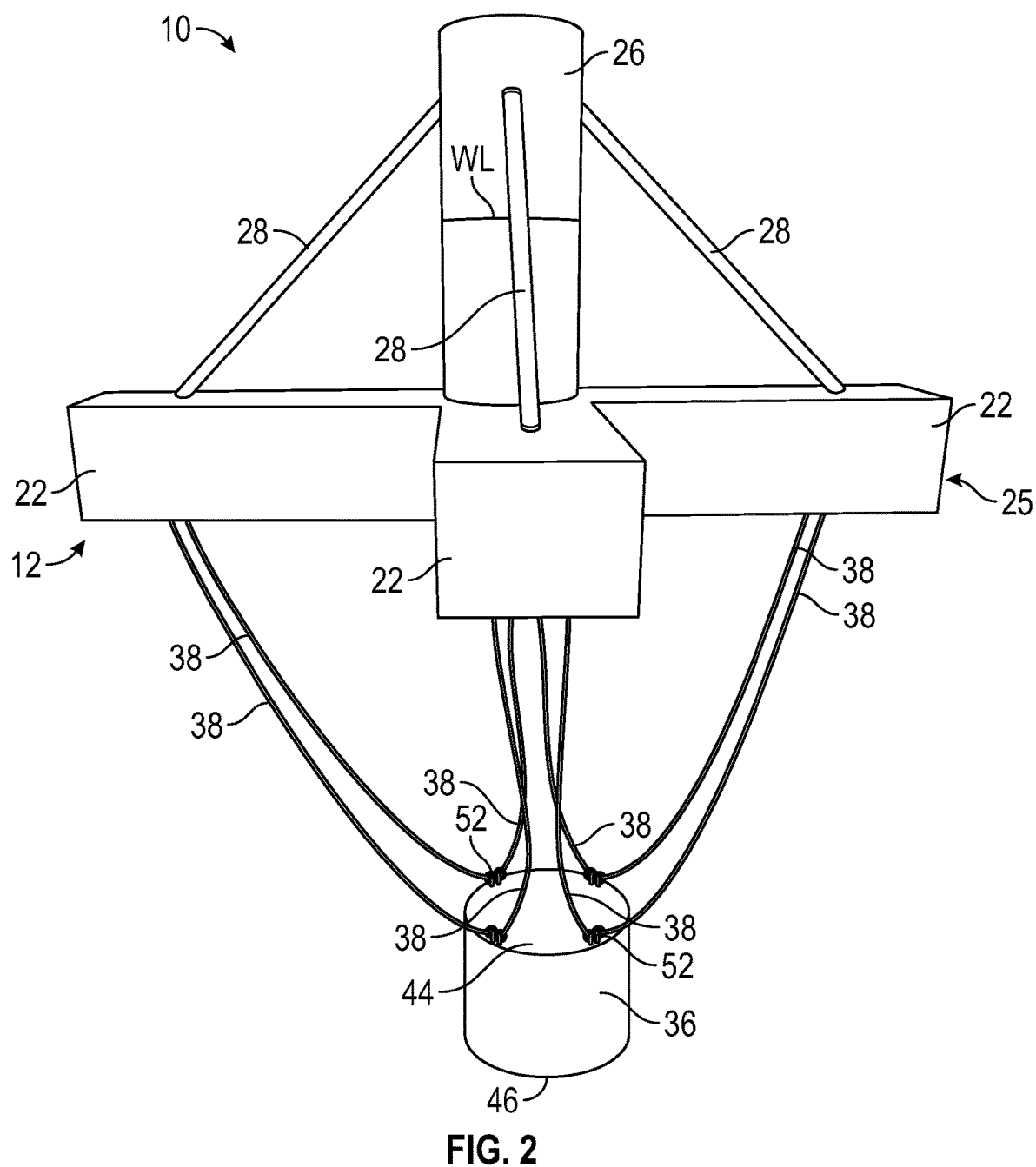
FIG. 2 is an alternate perspective view of the FOWT platform illustrated in FIG. 1 showing the suspended mass and the suspension lines connecting the suspended mass to the buoyant floater.

Referring to the drawings, particularly to FIGS. 1 and 2, an embodiment of a floating offshore wind turbine (FOWT) foundation or platform is shown at 10. The illustrated FOWT platform 10 is shown anchored to a bed of a body of water BW. The FOWT platform 10 is representative of a FOWT platform that has been assembled and deployed in accordance with the improved method of this invention. In the illustrated embodiment, the FOWT platform 10 is shown anchored to the seabed S. It will be understood that the seabed S may be the bed of any body of water in which the FOWT platform 10 will be placed into operation.

The illustrated FOWT platform 10 includes a buoyant floater 12 and a negatively buoyant mass 36 suspended from the buoyant floater 12. The buoyant floater 12 supports a tower 14, described below in detail. The tower 14 supports a wind turbine 16. The FOWT platform 10 is structured and configured to float, partially submerged, in a body of water. Accordingly, a portion of the buoyant floater 12 will be above water when the buoyant floater 12 is floating in the water and deployed at an operational draft, described below. As best shown in FIG. 1, a portion of the buoyant floater 12 is also below the waterline, as illustrated by the line WL on a central column 26, described below. As used herein, the waterline WL is defined as the approximate line where the surface of the water meets the FOWT platform 10. One or more mooring lines 18, two of which are shown in FIG. 1, may be attached to the FOWT platform 10 and further attached to anchors, such as the anchors 20 in the seabed S to limit to movement of the FOWT platform 10 on the body of water BW.

The illustrated buoyant floater 12 is formed from four pontoons 22 that extend radially outwardly from a central hub 24 and provide buoyancy. It will be understood that the buoyant floater 12 is configured to provide the primary source of buoyancy for the FOWT platform 10. When assembled together, the pontoons 22 and the central hub 24 define a generally cross-shaped base 25. The central column 26 is mounted to the central hub 24 and extends outwardly (upwardly when viewing FIGS. 1 and 2) and perpendicularly to the pontoons 22, and also provides buoyancy. Additionally, the central column 26 supports the tower 14, which is attached thereto. Optionally, braces 28 may connect distal ends of the pontoons 22 to an upper portion of the central column 26. Each pontoon 22 may be attached to one of the anchors 20 with one of the mooring lines 18.

The illustrated pontoons 22 have a rectangular cross-sectional shape. Alternatively, the pontoons 22 may have other shapes, such as, but not limited to, cylindrical, conical, and tubular having other desired geometric cross-sectional shapes such as pentagonal and hexagonal.

If desired, a catwalk or access platform (not shown) may be attached to the upper portion of the central column 26. Additionally, one or more access ladders (not shown) may mounted internally or externally of the central column 26.

In the embodiments illustrated herein, the wind turbine 16 is a horizontal-axis wind turbine. The size of the wind turbine 16 will vary based on the wind conditions at the location where the FOWT platform 10 is anchored and the desired power output. Advantageously, it has been shown that the illustrated FOWT platform 10 is ideally suited to support conventional commercial offshore wind turbines 16 having an output in the range of about 6 MW to about 20 MW. Alternatively, the FOWT platform 10 may be configured to support wind turbines 16 may having an output less than about 6 MW and greater than about 20 MW.

The wind turbine 16 includes a rotatable hub 30. At least one rotor blade 32 is coupled to and extends outward from the hub 30. The hub 30 is rotatably coupled to an electric generator (not shown). The electric generator may be coupled via a transformer (not shown) and an underwater power cable (not shown), as shown in FIG. 1, to a power grid (not shown). In the illustrated embodiment, the rotor has three rotor blades 32. In other embodiments, the rotor may have more or less than three rotor blades 32. A nacelle 34 is attached to the wind turbine 16 opposite the hub 30. In the embodiments illustrated herein, the wind turbine 16 is a horizontal-axis wind turbine (HAWT). Alternatively, the FOWT platform 10 may be configured to have a vertical-axis wind turbine (VAWT) mounted thereon.

Figure 3:
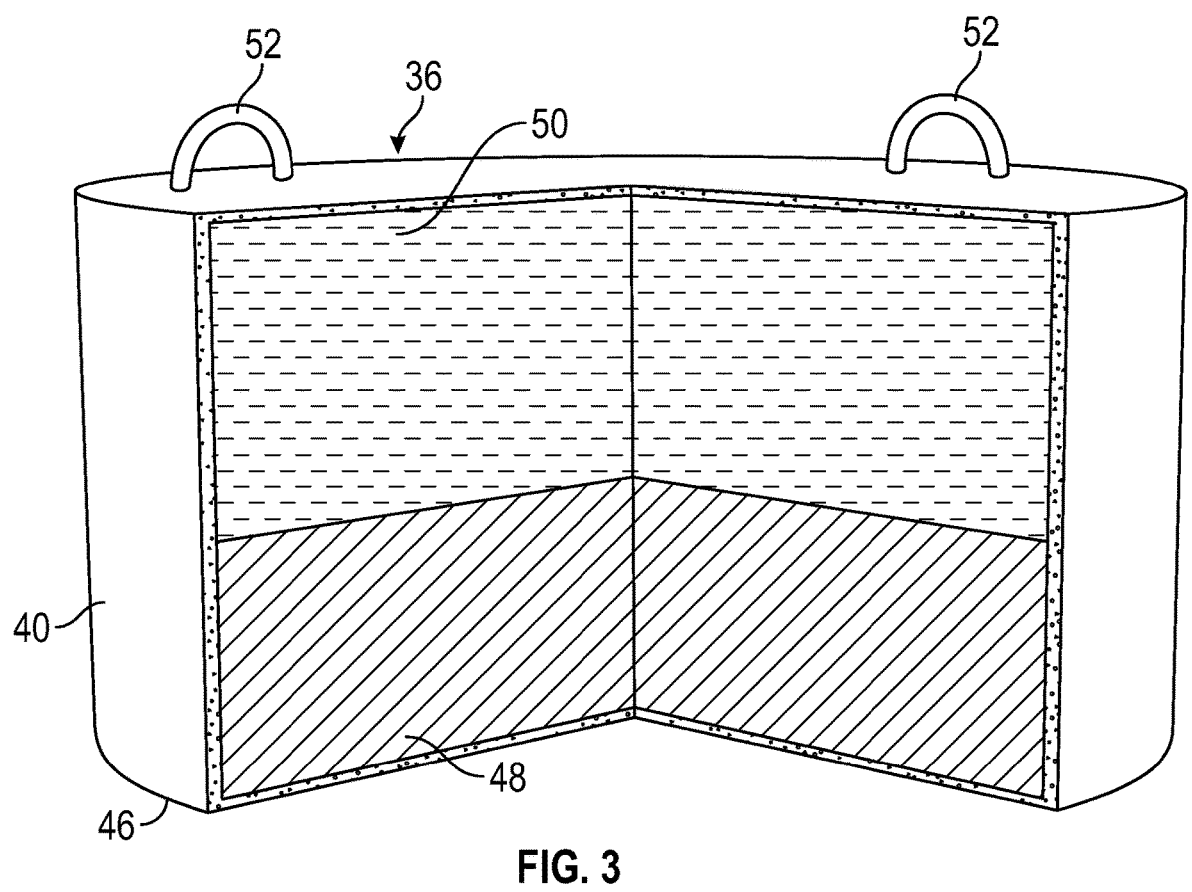
FIG. 3 is a cross-sectional view of the suspended mass illustrated in FIGS. 1 and 2.
Figure 6:
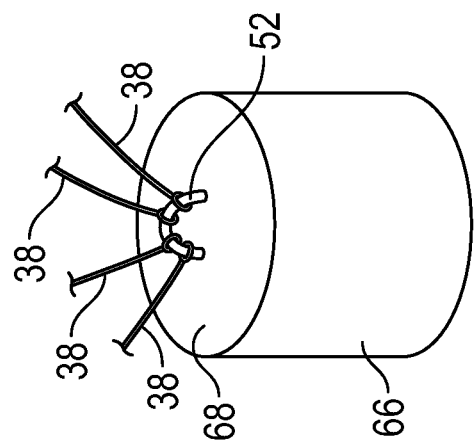
FIG. 6 is a perspective view of an alternate embodiment of the suspended mass illustrated in FIGS. 1 through 3.

Referring again to FIG. 1, the negatively buoyant mass 36 is shown suspended from the buoyant floater 12 by a plurality of suspension lines 38. Advantageously, the mass 36 has a simple design including a housing or outer tank 40 having cylindrical wall 42 enclosed by a first axial end wall 44 (the upper wall when viewing FIGS. 1 through 3) and a second axial end wall 46 (the lower wall when viewing FIGS. 1 through 3). The illustrated outer tank 40 is preferably formed from reinforced concrete and has a diameter of 15.15 m and a height of 11.94 m. An interior of the outer tank 40 includes a permanent ballast space configured to hold permanent ballast material 48 in a lower portion thereof, and a variable ballast space 50 in an upper portion thereof. As best shown in FIG. 2, four fairleads 52 are mounted to the first end wall 44. Alternatively, the outer tank 40 may have more than four fairleads 52, may have three fairleads 52, or may have two fairleads 52. Additionally, the first end wall 44 may have only one, centrally mounted fairlead 52, as shown in FIG. 6. The illustrated mass 36 has a cylindrical shape. Alternatively, the mass 36 may have other shapes, such as spherical, and cylindrical having a semi-spherical lower portion.

The permanent ballast material 48 may be any desired material, such as iron ore, or other material selected to achieve a desired, pre-determined mass necessary to balance gravity and the buoyancy of the assembled FOWT platform 10 as a complete system.

The plurality of suspension lines 38 that attach the mass 36 to the buoyant floater 12 may be formed from synthetic ropes, chains, cables, such as steel cables, and tubular steel structures. As shown in FIG. 2 the mass 36 is attached to each pontoon 22 by two suspension lines 38, for a total of eight suspension lines 38. The mass 36 may also be attached to each pontoon by a single suspension line 38 or by more than two suspension lines 38. When the FOWT platform 10 is fully deployed in a body of water BW, as described in detail below, each suspension line 38 will have a length sufficient so that the mass 36 will be suspended about 75.10 m below the buoyant floater 12. The mass 36 may include a pump (not shown) for removing sea water from the variable ballast space 50.

The distance that the mass 36 may be suspended below the buoyant floater 12 will vary based on the size of the buoyant floater 12 and the size of the wind turbine 16 and the tower 14 supported thereon. For example, in an alternate embodiment of the FOWT platform 10, the mass 36 may be suspended about 40 m below a lower surface of the buoyant floater 12.

The illustrated central hub 24 is hollow and has four side walls, each side wall having a width of about 10.98 m and an axial length or height of about 8.53 m. Each side wall of the central hub 24 defines a substantially vertical connection face to which the pontoons 22 will be attached. In the illustrated embodiment, the central hub 24 includes four side walls and has a substantially square cross-sectional shape. The four side walls are enclosed by a first axial end wall 24A (the upper wall when viewing FIGS. 1 and 2) and a second axial end wall (the lower wall when viewing FIGS. 1 and 2). Alternatively, the central hub 24 may have other configurations, such as three side walls for the attachment of three pontoons 22. The central hub 24 may also have internal watertight bulkheads for strength and/or to define variable water ballast chambers (not shown).

The illustrated central hub 24 may be formed from pre-stressed reinforced concrete, and may include an internal central cavity (not shown). Any desired process may be used to manufacture the central hub 24, such as a spun concrete process, with conventional concrete forms, or with reusable concrete forms in a semi-automated process such as used in the precast concrete industry. The concrete of the central hub 24 may be reinforced with any conventional reinforcement material, such as high tensile steel cable and high tensile steel reinforcement bars or REBAR. Alternatively, the central hub 24 may be formed from FRP, steel, or combinations of pre-stressed reinforced concrete, FRP, and steel. The central hub 24 may be formed in sections, as described below.

Each pontoon 22 is also hollow and has a width of 10.98 m, a height of 8.53 m, and a length of 27.08 m. Like the central hub 24, the illustrated pontoons 22 are formed from pre-stressed reinforced concrete as described above. Alternatively, the pontoons 22 may be formed from FRP, steel, or combinations of pre-stressed reinforced concrete, FRP, and steel. The pontoons 22 may be formed in sections, as described below.

The central column 26 is hollow and has a diameter of 10.44 m and a height of 26.5 m. The central column 26 includes a cylindrical side wall 27 having an outer surface, a first axial end wall 26A (the upper wall when viewing FIGS. 1 and 2), a second axial end wall 26B (the lower wall when viewing FIGS. 1 and 2), and defines a hollow interior space (not shown). The hollow central column 26 may include transverse bulkheads or decks configured and positioned for strength or for the mounting of electrical and mechanical components of the FOWT platform 10.

Like the central hub 24 and the pontoons 22, the illustrated central column 26 is formed from pre-stressed reinforced concrete as described above. Alternatively, the central column 26 may be formed from FRP, steel, or combinations of pre-stressed reinforced concrete, FRP, and steel. The central column 26 may be formed in sections, as described below. The illustrated braces 28 are formed from steel.

The pontoons 22 provide a source of buoyancy and define a water-plane area when the buoyant floater 12 is being towed in a body of water BW. Although not illustrated, each pontoon 22 may include watertight transverse bulkheads for watertight stability, and longitudinally extending bulkheads, and decks, arranged perpendicularly to side walls of the pontoon 22 for strength. Additionally, the internal bulkheads in each pontoon 22 may define ballast chambers (not shown) for variable water ballast.

The illustrated FOWT platform 10 includes four pontoons 22. It will be understood however, that the FOWT platform 10 assembled in accordance with the improved method of this invention, may be constructed with three pontoons 22 or with more than four pontoons 22.

Advantageously, temporary transit lines 56 and a lifting devices such as winches or chain jacks, schematically illustrated at 58, movably connect the mass 36 to the buoyant floater 12 during deployment and re-deployment, as described below. The transit lines 56 may be lengths of chain or cables, such as steel cables. As best shown in FIGS. 4E and 5, the transit lines 56 connect the mass 36 to the buoyant floater 12 via the winches or chain jacks 58. The chain jacks 58 may be mounted at any desired location on or within the buoyant floater 12, such as on the first axial end wall 24A of the central hub 24, as shown in FIG. 5. Alternatively, the chain jacks 58 may be mounted within the central hub 24, or on or within one or more of the pontoons 22.

As described above each of the components of the mass 36 and the buoyant floater 12, i.e., the central hub 24, the pontoons 22, and the central column 26 may be formed from concrete and may have cross-sectional shapes other than as illustrated.

The mass 36 and the buoyant floater 12, including the individual components of the buoyant floater 12, may be formed in different sizes to be determined by the size of the wind turbine 16 and the tower 14 supported thereon.

In a first embodiment of a method of forming the mass 36 and the buoyant floater 12, the outer tank 40 may be formed, i.e., pre-cast, as one large, monolithic section, or may be formed in two or more sections (not shown). Such sections may then be post-tensioned together during assembly of the outer tank 40. Similarly, the central hub 24 may be formed as one large, monolithic section, or may be formed in two or more sections (not shown), although preferably not more than four sections. Such sections may then be transversely post-tensioned together (i.e., transversely to its axial length) during assembly of the central hub 24.

The pontoons 22 may be formed in sections, such as sections having a length of about 3 meters. Thus, in one exemplary embodiment, each pontoon 22 may be formed in nine sections. As will be described below, the pontoons 22 may be longitudinally post-tensioned in pairs after each of the pair of pontoons 22 has been assembled to the central hub 24.

The central column 26 may likewise be formed in sections, such as sections having a length of about 3 meters. Thus, in one exemplary embodiment, the central column 26 may be formed in about nine sections. As will be described below, the central column 26 may be longitudinally post-tensioned.

A first embodiment of a method of assembling and deploying the buoyant floater 12 includes forming and assembling a plurality of the pontoons 22, the central hub 24, the central column 26, the mass 36, and the braces 28 by any of the methods described herein in an on-shore location. Two of the pontoons 22 may then be assembled to the central hub 24 and the assembled pontoons 22 and central hub 24 may be post-tensioned from a distal end of one of the pontoons 22 to a distal end of the other of the pontoons 22. A third pontoon 22 and a fourth pontoon 22 may then be assembled to the central hub 24 and may also be post-tensioned from a distal end of the third pontoon 22 to a distal end of the fourth pontoon 22.

The central column 26 may then be assembled from sections on the first axial end wall 24A of the central hub 24 and longitudinally post-tensioned. The braces 28, if provided, may then be attached between the pontoons 22 and the central column 26. The tower 14 and the wind turbine 16 may then be installed, thus defining the buoyant floater 12. The buoyant floater 12 may be launched into the body of water BW by any conventional method, such as by using finger piers (not shown).

For example, a pair of finger piers (not shown) may extend outwardly from the shoreline SL or a dock (not shown). The buoyant floater 12 may be moved, such as by rail or other desired means of transport, onto the finger piers such that a portion of the buoyant floater 12 is supported on distal ends of both of the finger piers and supported thereon above a surface of the body water BW, and a portion of the buoyant floater 12 remains supported on the shore line or dock from which the finger piers extend. A floating launch platform, such as a semi-submersible or launch barge (not shown) may be moved between the finger piers and underneath the buoyant floater 12. Once positioned beneath the buoyant floater 12, ballast may be removed from the launch platform to cause the launch platform to rise in the body of water BW until the launch platform lifts the buoyant floater 12 off of the finger piers and the shoreline, thereby transferring the buoyant floater 12 onto the launch platform. The launch platform may then be towed to a launch area in the body of water BW.

Although the first embodiment of the method assembling and deploying the buoyant floater 12 is described as occurring in an on-shore location, it will be understood that the buoyant floater 12 may also be assembled in a dry dock, if the dry dock is large enough accommodate assembled buoyant floater or any of its component part or subassemblies, such as an assembled assembly of two pontoons 22 and the central hub 24.

A second embodiment of the method of assembling and deploying the buoyant floater 12 occurs within a dry dock (not shown) and includes forming and assembling two of the pontoons 22, assembling the central hub 24, assembling the pontoons 22 to the central hub 24, and post-tensioned the assembled pontoons 22 and central hub 24 from a distal end of one of the pontoons 22 to a distal end of the other of the pontoons 22 to define a buoyant floater sub-assembly 60 that is fully capable of floating on its own.

Once assembled, the buoyant floater sub-assembly 60 may be launched from the dry dock in a conventional manner and allowed to float in a floating assembly area (not shown), preferably near the dry dock.

Two additional pontoons 22 may then be assembled in the dry dock, and temporarily post-tensioned to provide structural integrity of the pontoons 22 prior to being assembled onto the buoyant floater sub-assembly 60. Once assembled, the two additional pontoons 22 may be launched from the dry dock in a conventional manner and allowed to float in the floating assembly area (not shown) wherein the buoyant floater sub-assembly 60 is located.

Each of the two additional pontoons 22 are then mated to the open side walls of the central hub 24 of the buoyant floater sub-assembly 60 and attached thereto. The two additional pontoons 22 and the central hub 24 are then post-tensioned from a distal end of one of the pontoons 22 to a distal end of the other of the pontoons 22 to define the buoyant floater 12.

Figure 7:
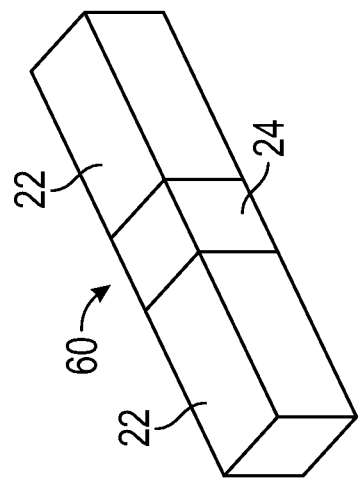
FIG. 7 is a perspective view of the buoyant floater sub-assembly.

It will be understood that when floating, a portion of the buoyant floater sub-assembly 60 and a portion of the buoyant floater 12 remain above the water line, as shown in FIG. 7. It will be further understood that the step of post-tensioning the buoyant floater sub-assembly 60 and the additional pontoons 22 to the buoyant floater sub-assembly 60 to define the buoyant floater 12 will occur above the waterline, and will therefore be in dry portions of the pontoons 22 and the central hub 24.

The central column 26 may then be formed in sections on shore, such as described above, assembled on the first axial end wall 24A of the central hub 24 while the buoyant floater 12 is floating, such as alongside a dock, and longitudinally post-tensioned. The braces 28 may then be attached between the pontoons 22 and the central column 26, also while the buoyant floater 12 is floating alongside a dock.

The tower 14 and the wind turbine 16 may then be installed on the central column 26 while the buoyant floater 12 is floating, preferably above the submerged mass 36, as described below. Alternatively, if the depth of the body of water BW permits it, ballast may be added to the buoyant floater 12 to move the buoyant floater 12 temporarily to the seabed S to install the tower 14 and the wind turbine 16.

The depth of the mass 36 is variable, thus allowing for a shallow tow-out draft of about 10 m or less, that is comparable to a semi-submersible FOWT. Thus, the FOWT platform 10 has the mobility characteristics of a semi-submersible FOWT combined with the stability characteristics of a spar-type platform.

As configured in the embodiments described herein, the buoyant floater 12 has a tow-out or shallow draft of 7.53 m and the assembled FOWT platform 10 has an operational draft of 21.25 m.

A first embodiment of a method of assembling and deploying the mass 36 includes forming, such as by casting, sections (not shown) of the outer tank 40 in an on-shore location. Such sections may then be post-tensioned together. The assembled, but empty outer tank 40 may then be launched into the body of water BW by any desired method and allowed to float in the floating assembly area (not shown) wherein the buoyant floater 12 is located.

A second embodiment of a method of assembling and deploying the mass 36 includes forming the outer tank 40 as one large, monolithic section using conventional slip-forming or staged casting methods in an on-shore location. Once cast, the empty outer tank 40 may then be launched into the body of water BW by any desired method and allowed to float in the floating assembly area (not shown) wherein the buoyant floater 12 is located.

A first embodiment of the improved method of assembling and deploying the FOWT platform 10 into a body of water BW is shown schematically in FIGS. 4A through 4F.

Figure 4F:
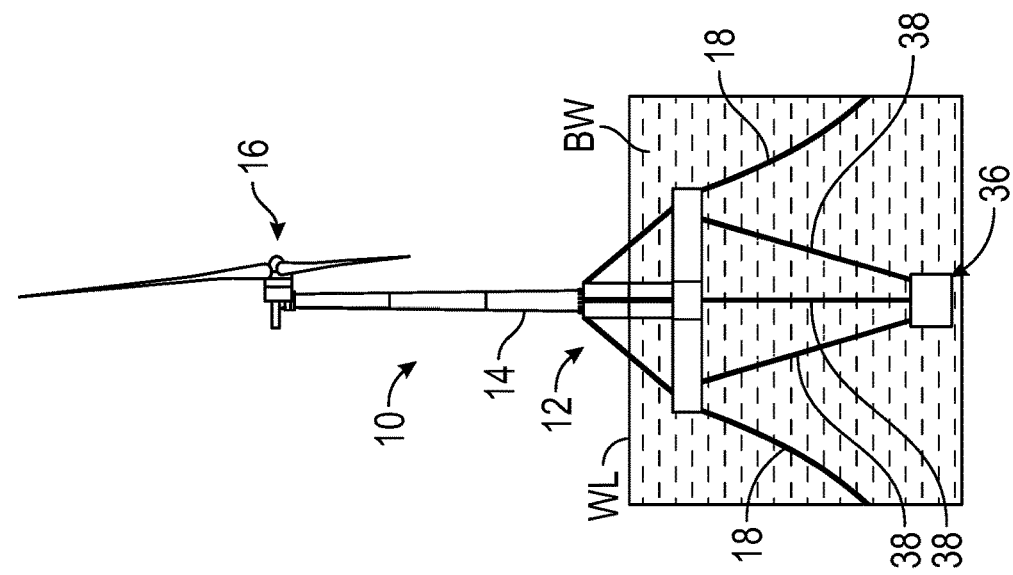
FIG. 4F is a schematic illustration of a sixth step of the first embodiment of the improved method of this invention.
Figure 4E:
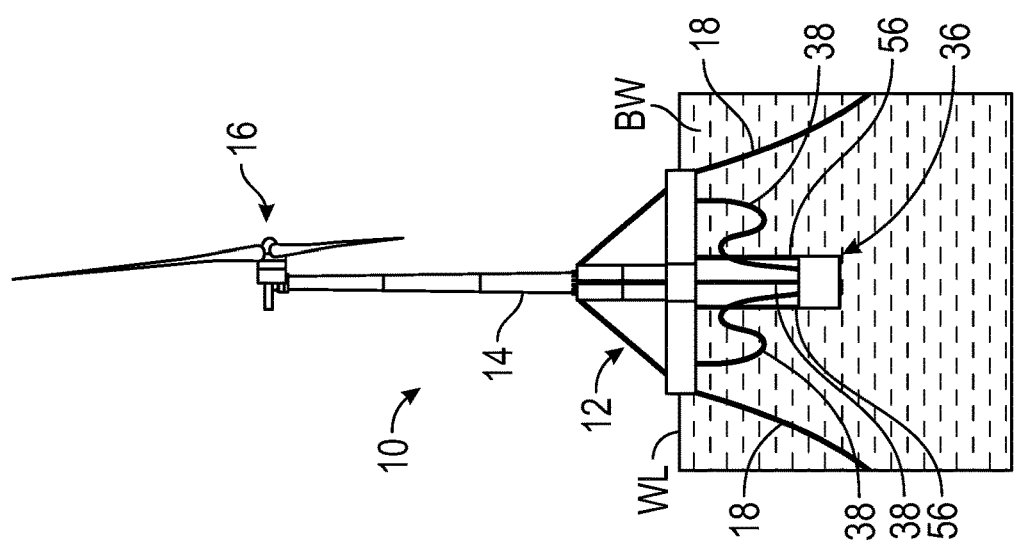
FIG. 4E is a schematic illustration of a fifth step of the first embodiment of the improved method of this invention.

As shown in FIG. 4A, an empty outer tank 40 of the mass 36 may be launched from a dock or shoreline SL into the body of water BW by any desired method and allowed to float in the floating assembly area (not shown) wherein the buoyant floater 12 is located (the buoyant floater 12 is not shown in FIG. 4A or 4B, but is shown in FIGS. 4C through 4F).

The permanent ballast material 48 may then be added to the outer tank 40, thus defining the mass 36, and causing the mass 36 to sink to the seabed S, as shown in FIG. 4B. As the mass 36 sinks, the variable ballast space 50 fills with sea water.

The transit lines 56 and the suspension lines 38 may be preinstalled on the mass 36 and may be carried to the surface of the body of water BW with marker buoys attached to free ends of each of the transit lines 56 and the suspension lines 38.

If not already launched into the body of water BW, the buoyant floater 12 may be launched and then floated, i.e., moved, to a position over the mass 36. At this step of the method of assembling and deploying the FOWT platform 10 into a body of water BW, the ballast chambers in the buoyant floater 12 contain no ballast water, thus allowing the buoyant floater 12 to float. It is at this step also, that the tower 14 and the wind turbine 16 may then be installed on the central column 26 while the buoyant floater 12 is floating.

Figure 4D:
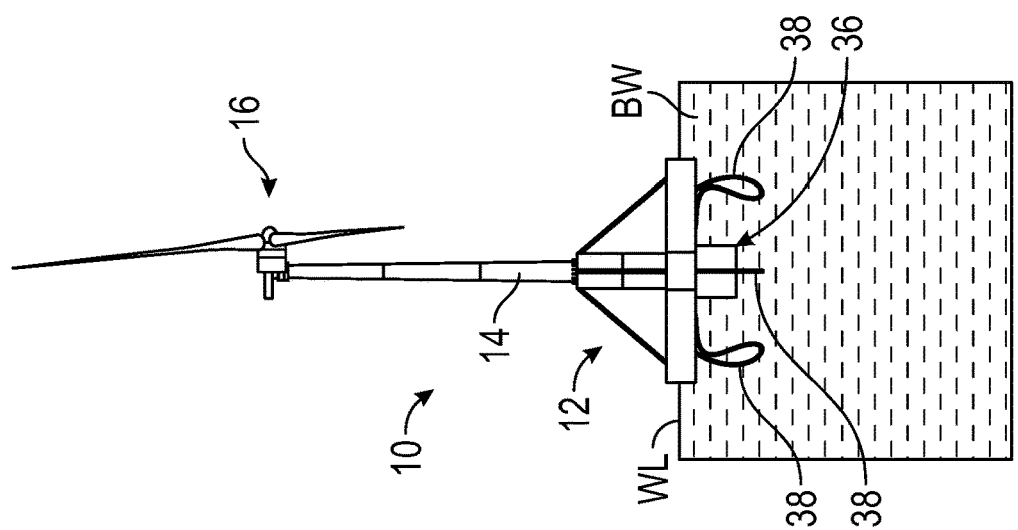
FIG. 4D is a schematic illustration of a fourth step of the first embodiment of the improved method of this invention.
Figure 5:
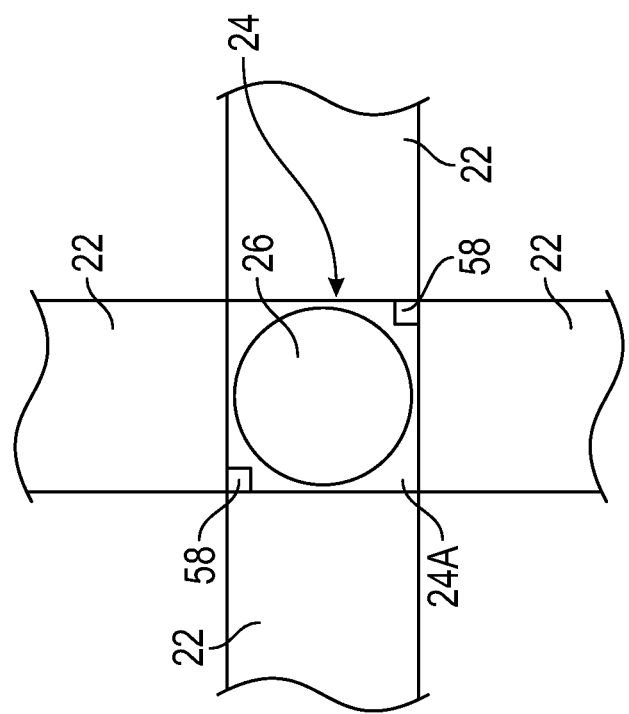
FIG. 5 is a top plan view of a portion of the buoyant floater illustrated in FIGS. 1 through 3.

The temporary transit lines 56 and associated chain jacks 58 may now be used to lift the mass 36 to a point directly under the buoyant floater 12 to define a shallow draft configuration, i.e., the draft of 7.53 m, as shown in FIGS. 4C and 4D. The installed suspension lines 38 are attached to the mass 36 and left slack. At this point, the FOWT platform 10 behaves as a rigid body characterized by a vertical center of gravity that is above the vertical center of buoyancy. Thus, FOWT platform 10 stability is achieved via a waterplane moment of inertia generated by the partially submerged pontoons 22 of the FOWT platform 10.

The now assembled FOWT platform 10 may then be towed to an installation site in the body of water BW. At this point, the FOWT platform 10 continues to behave as a rigid body characterized by a vertical center of gravity that is above the vertical center of buoyancy. Thus, the FOWT platform's 10 natural periods may fall within a range of typical wave periods. Accordingly, this step of towing the assembled FOWT platform to the installation site in the body of water BW should only be conducted in relatively calm seas.

Alternatively, means other than the winches or chain jacks 58 may be used to raise and lower the mass 36 to and from the buoyant floater 12. Alternative means for raising and lowering the mass 36 include, but are not limited to, a removable floatation device, such as an inflatable device, removable, external ballast tanks, and temporary barge support. Additionally, the mass 36 may be configured to float under or alongside the buoyant floater 12.

Once the FOWT platform 10 has reached the installation site in the body of water BW, the mooring lines 18 attached to the pontoons 22 of the FOWT platform 10 may be connected to the anchors 20 in the seabed S. The mass 36 may then be lowered using the temporary transit lines 56 and associated chain jacks 58, as shown in FIG. 4E. The temporary transit lines 56 may be removed from the mass 36 once the suspension lines 38 become taught, and thus carry the full weight of the suspended mass 36, as shown in FIG. 4F.

The pontoons 22 may be fully submerged by flooding the internal ballast chambers with sea water. The FOWT platform 10 now rests at its design draft, as shown in FIG. 4E, and wherein the FOWT platform 10 is positioned in the body of water BW such that the waterline WL is at a mid-point of the central column 26.

Although FIGS. 1 through 4F illustrate the mass 36 having four fairleads 52 for the connection of suspension lines 38, the mass 36 may include any desired number of fairleads 52, configured for the attachment of any desired number of suspension lines 38. For example, the mass 36 may include three fairleads 52, two fairleads 52, or a single fairlead 52, as shown in FIG. 6, wherein an alternate embodiment of the mass 66 has only one fairlead 52 mounted to a first end wall 68 thereof.

Advantageously, by allowing the suspended mass 36 to be free to rotate and have its own natural period of vibration, it may be tuned to mitigate the motion experienced by the deployed buoyant floater 12. This period of vibration may be obtained by precisely selecting the number of suspension lines 38, their attachment point or points on the mass 36, and tuning the center of gravity location and mass moment of inertia of the suspended mass 36, to achieve a vibrational frequency that is favorable for reducing motion of the buoyant floater 12 and wind turbine nacelle 34.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of assembling and deploying a floating offshore wind turbine (FOWT) platform comprising:
    floating a hollow outer tank in a floating assembly area of a body of water, the hollow outer tank having transit lines and suspension lines attached thereto;
    floating a buoyant floater in the floating assembly area of the body of water;
    placing permanent ballast material in the hollow outer tank to define a mass, and sinking the mass to a seabed of the body of water;
    raising free ends of the transit lines and the suspension lines to a surface of the body of water with buoys;
    moving the buoyant floater to a position over the mass;
    attaching the transit lines to a lifting device in the buoyant floater and attaching the suspension lines to a portion of the buoyant floater, the combined buoyant floater and the mass defining a FOWT platform;
    lifting the mass with the lifting device to a point directly under the buoyant floater;
    towing the FOWT platform to an installation site in the body of water;
    attaching mooring lines to anchors in the seabed and to the buoyant floater;
    lowering the mass with the transit lines and the lifting device to a depth wherein the suspension lines are taught, thus suspending the mass with the suspension lines to define a suspended mass; and
    one of storing and removing the transit lines from the mass.

2. The method of assembling and deploying a FOWT platform according to claim 1, wherein the hollow outer tank and the buoyant floater are launched from one of a dock and shoreline into the body of water.

3. The method of assembling and deploying a FOWT platform according to claim 1, wherein the permanent ballast material is iron ore.

4. The method of assembling and deploying a FOWT platform according to claim 1, wherein the hollow outer tank defines a permanent ballast space and a variable ballast space, and wherein as the mass sinks, the variable ballast space fills with sea water.

5. The method of assembling and deploying a FOWT platform according to claim 1, wherein the step of lifting the mass with the lifting device to a point directly under the buoyant floater includes attaching marker buoys to free ends of each of the transit lines and the suspension lines.

6. The method of assembling and deploying a FOWT platform according to claim 1, further including installing a tower and a wind turbine on the buoyant floater prior to the step of lifting the mass with the lifting device to a point directly under the buoyant floater.

7. The method of assembling and deploying a FOWT platform according to claim 1, wherein when the mass has been lifted and positioned directly under the buoyant floater, the FOWT platform is in a shallow draft configuration.

8. The method of assembling and deploying a FOWT platform according to claim 7, wherein in the shallow draft configuration, the suspension lines are slack.

9. The method of assembling and deploying a FOWT platform according to claim 8, wherein in the shallow draft configuration, the FOWT platform behaves as a rigid body having by a vertical center of gravity that is above its vertical center of buoyancy.

10. The method of assembling and deploying a FOWT platform according to claim 1, wherein a first end wall of the hollow outer tank of the mass includes a fairlead for attaching at least one of the suspension lines.

11. The method of assembling and deploying a FOWT platform according to claim 1, wherein a first end wall of the hollow outer tank of the mass includes a plurality of fairleads, each configured for attaching at least one of the suspension lines.

12. The method of assembling and deploying a FOWT platform according to claim 1, wherein the buoyant floater includes:
   a central hub;
   three or more buoyant pontoons that extend radially outwardly from the central hub, and defining cross-shaped base;
   a central column mounted to the central hub and extending outwardly and perpendicularly to the buoyant pontoons; and
   braces connecting distal ends of the buoyant pontoons to an upper portion of the central column.

13. The method of assembling and deploying a FOWT platform according to claim 12, further including a tower supporting a wind turbine on the central column.

14. The method of assembling and deploying a FOWT platform according to claim 12, wherein at least one of the hollow outer tank, the central hub, the buoyant pontoons, and the central column are formed in sections.

15. The method of assembling and deploying a FOWT platform according to claim 13, further including:
   forming and assembling a plurality of the buoyant pontoons, the central hub, the mass, and the braces in an on-shore location;
   assembling a first and a second pontoon to the central hub;
   post-tensioning the assembled first and second pontoons and central hub from a distal end of the first pontoon to a distal end of the second pontoon to define a buoyant floater sub-assembly;
   assembling a third and a fourth pontoon to the central hub of the buoyant floater sub-assembly; and
   post-tensioning the assembled third and fourth pontoons and buoyant floater sub-assembly from a distal end of the third pontoon to a distal end of the fourth pontoon.

16. The method of assembling and deploying a FOWT platform according to claim 15, further including:
   forming sections of the central column;
   assembling the sections of the central column on a first axial end wall of the central hub;
   longitudinally post-tensioning the central column to the central hub;
   attaching the braces between the buoyant pontoons and the central column;
   installing the tower and the wind turbine, thus defining the buoyant floater; and
   launching the buoyant floater into the body of water.

17. The method of assembling and deploying a FOWT platform according to claim 12, further including:
   forming and assembling a first and a second pontoon within a dry dock;
   assembling the central hub within the dry dock;
   assembling the first and second pontoons to the central hub;
   post-tensioning the assembled first and second pontoons and central hub from a distal end of the first pontoon to a distal end of the second pontoon to define a buoyant floater sub-assembly;
   launching the buoyant floater sub-assembly into a floating assembly area;
   forming and assembling a third and a fourth pontoon within the dry dock;
   temporarily post-tensioning each of the third and the fourth pontoons;
   launching the third and the fourth pontoons into the floating assembly area;
   assembling a third and a fourth pontoon to the central hub of the buoyant floater sub-assembly; and
   post-tensioning the assembled third and fourth pontoons and buoyant floater sub-assembly from a distal end of the third pontoon to a distal end of the fourth pontoon, thus defining the buoyant floater.

18. The method of assembling and deploying a FOWT platform according to claim 17, wherein the steps during the steps of post-tensioning the assembled first and second pontoons and central hub, and post-tensioning the assembled third and fourth pontoons and the buoyant floater sub-assembly occur in portions of the first, second, third, and fourth pontoons and the central hub that are above a water line when the buoyant floater sub-assembly and the third and fourth pontoons are floating in the body of water.

19. The method of assembling and deploying a FOWT platform according to claim 1, wherein the suspended mass has a natural period of motion that is selected based on the mass and a geometric location of attachment points of the suspension lines on the mass to reduce an overall motion of the FOWT platform.

20. The method of assembling and deploying a FOWT platform according to claim 1, wherein the lifting device is one of a winch and a chain jack.

21. A method of assembling and deploying a floating offshore wind turbine (FOWT) platform comprising:
   floating a hollow outer tank in a floating assembly area of a body of water, the hollow outer tank having transit lines and suspension lines attached thereto;
   assembling a buoyant floater;
   floating a buoyant floater in the floating assembly area of the body of water;
   placing permanent ballast material in the hollow outer tank to define a mass, and sinking the mass to a seabed of the body of water;
   raising free ends of the transit lines and the suspension lines to a surface of the body of water with buoys;
   moving the buoyant floater to a position over the mass;
   attaching the transit lines to a lifting device in the buoyant floater and attaching the suspension lines to a portion of the buoyant floater, the combined buoyant floater and the mass defining a FOWT platform;
   lifting the mass with the lifting device to a point directly under the buoyant floater;
   towing the FOWT platform to an installation site in the body of water;
   attaching mooring lines to anchors in the seabed and to the buoyant floater;
   lowering the mass with the transit lines and the lifting device to a depth wherein the suspension lines are taught, thus suspending the mass with the suspension lines to define a suspended mass; and
   one of storing and removing the transit lines from the mass;
   wherein the buoyant floater includes:
      a central hub;
      three or more buoyant pontoons that extend radially outwardly from the central hub, and defining cross-shaped base;
      a central column mounted to the central hub and extending outwardly and perpendicularly to the buoyant pontoons;
      braces connecting distal ends of the buoyant pontoons to an upper portion of the central column; and
      a tower supporting a wind turbine on the central column; and wherein the method further includes:
   forming and assembling a plurality of the buoyant pontoons, the central hub, the mass, and the braces in an on-shore location;

assembling a first and a second pontoon to the central hub;
post-tensioning the assembled first and second pontoons and central hub from a distal end of the first pontoon to a distal end of the second pontoon to define a buoyant floater sub-assembly;
assembling a third and a fourth pontoon to the central hub of the buoyant floater sub-assembly;
post-tensioning the assembled third and fourth pontoons and the buoyant floater sub-assembly from a distal end of the third pontoon to a distal end of the fourth pontoon;
forming sections of the central column;
assembling the sections of the central column on a first axial end wall of the central hub;
longitudinally post-tensioning the central column to the central hub;
attaching the braces between the buoyant pontoons and the central column;
installing the tower and the wind turbine, thus defining the buoyant floater; and
launching the buoyant floater into the body of water.

22. A method of assembling and deploying a floating offshore wind turbine (FOWT) platform comprising:
floating a hollow outer tank in a floating assembly area of a body of water, the hollow outer tank having transit lines and suspension lines attached thereto;
floating a buoyant floater in the floating assembly area of the body of water;
placing permanent ballast material in the hollow outer tank to define a mass, and sinking the mass to a seabed of the body of water;
raising free ends of the transit lines and the suspension lines to a surface of the body of water with buoys;
moving the buoyant floater to a position over the mass;
attaching the transit lines to a lifting device in the buoyant floater and attaching the suspension lines to a portion of the buoyant floater, the combined buoyant floater and the mass defining a FOWT platform;
lifting the mass with the lifting device to a point directly under the buoyant floater;
towing the FOWT platform to an installation site in the body of water;
attaching mooring lines to anchors in the seabed and to the buoyant floater;
lowering the mass with the transit lines and the lifting device to a depth wherein the suspension lines are taught, thus suspending the mass with the suspension lines to define a suspended mass; and
one of storing and removing the transit lines from the mass;
wherein the buoyant floater includes:
a central hub;
three or more buoyant pontoons that extend radially outwardly from the central hub, and defining cross-shaped base;
a central column mounted to the central hub and extending outwardly and perpendicularly to the buoyant pontoons; and
braces connecting distal ends of the buoyant pontoons to an upper portion of the central column; and
wherein the method further includes:
forming and assembling a first and a second pontoon within a dry dock;
assembling the central hub within the dry dock;
assembling the first and second pontoons to the central hub;
post-tensioning the assembled first and second pontoons and central hub from a distal end of the first pontoon to a distal end of the second pontoon to define a buoyant floater sub-assembly;
launching the buoyant floater sub-assembly into a floating assembly area;
forming and assembling a third and a fourth pontoon within the dry dock;
temporarily post-tensioning each of the third and the fourth pontoons;
launching the third and the fourth pontoons into the floating assembly area;
assembling a third and a fourth pontoon to the central hub of the buoyant floater sub-assembly; and
post-tensioning the assembled third and fourth pontoons and the buoyant floater sub-assembly from a distal end of the third pontoon to a distal end of the fourth pontoon, thus defining the buoyant floater.

* * * * *